Oct. 12, 1937.　　　T. H. ALFREDS　　　2,095,686
CAKE PLATE OF MOLDED FIBROUS MATERIAL
Filed March 30, 1936
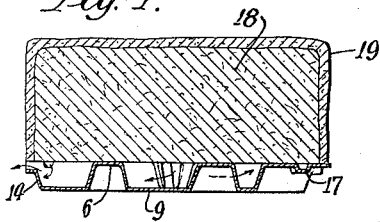
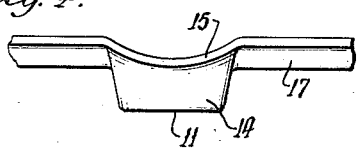
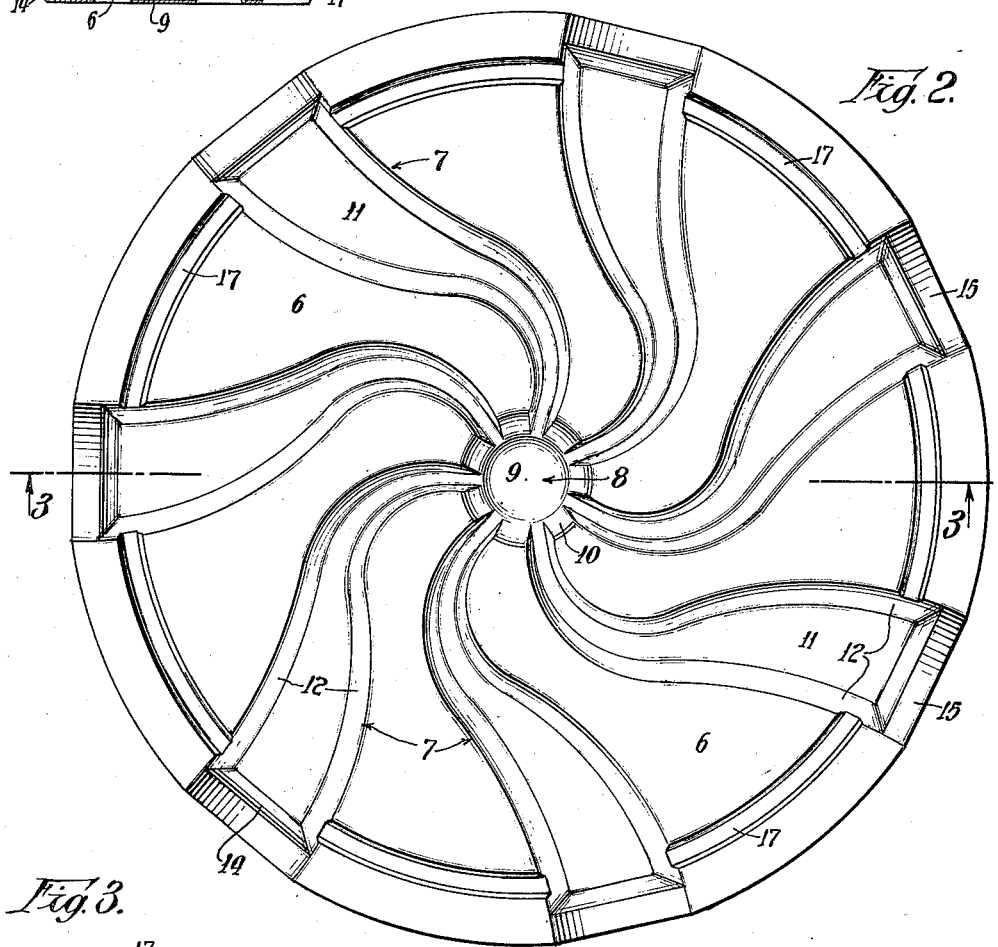
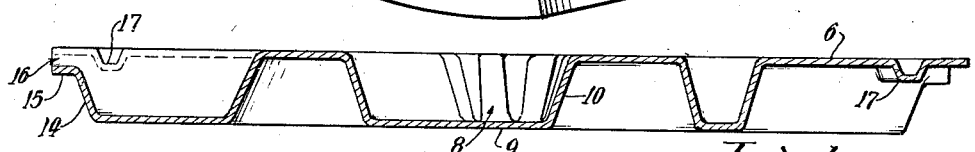
Inventor:
Torris H. Alfreds,
By: Arthur W. Nelson
Attorney.
Witness:
E. Camporini Patented Oct. 12, 1937

2,095,686

UNITED STATES PATENT OFFICE 2,095,686

CAKE PLATE OF MOLDED FIBROUS MATERIAL

Torris H. Alfreds, Park Ridge, Ill., assignor to Mapes Consolidated Manufacturing Company, Griffith, Ind., a corporation of Delaware Application March 30, 1936, Serial No. 71,621

5 Claims. (Cl. 65—15)

This invention relates to improvements in cake plates of molded fibrous material and it consists of the matters hereinafter described and more particularly pointed out in the appended claims.

The invention is more particularly concerned with that type of plate upon which cakes are placed for future handling, soon after they have been removed from the baking pan and before they have lost their heat. The sheet of fibrous material, of which the plate is made, besides being relatively thin, does not in itself possess much strength. Therefore, certain portions of the sheet are formed as hollow projections on the bottom side of the sheet to provide that strength necessary to make the plate practical in use. It has recently been proposed to provide hollow projections defining grooves in the top of the plate, in such a way as to vent to atmosphere near the peripheral margin of the plate. The reason, therefore, is to carry off and dissipate the vapors generated by the cake in its cooling. In this manner, the plate is prevented from absorbing moisture from the condensed vapor and therefore remains more rigid and also the transmission of a pulpy flavor from the plate to the cake is avoided. As this feature is the invention of another, no claim is made broadly to that feature.

Such hollow projections have been arranged so as to radiate from the center of the plate along a straight line. It is apparent that with such an arrangement the length of the projections were limited by the dimensions of the plate and that there is always some place in the plate where a diametrical line through the center of the plate would pass through the flat portions between the projections. Such portions would not, therefore, be strengthened in all directions against bending, except by the strength inherent in material of that particular thickness.

When an even number of such projections are used, such a line may pass longitudinally through at least two of said projections, so that they act to strengthen the plate circumferentially but not diametrically or radially.

One of the objects of the present invention is to provide a plate of this kind in which the hollow projections are non-radial and have such a configuration or shape as to strengthen or rigidify the plate circumferentially as well as diametrically or radially.

Another object of the invention is to provide a plate of this kind wherein the hollow projections are so formed that a diametrical line through the center of the plate passes through parts of more than one of said projections in a direction other than along the length of said projections.

A further object of the invention is to provide a plate of this kind having a central depression and a plurality of hollow projections on the bottom side of the plate, extending from the said depression toward the peripheral margin of the plate, the projections being of such configuration that they have a length greater than the distance between said depression and said margin on a line radiating from the center of said depression.

The above mentioned objects of the invention, as well as others, together with the advantages thereof will more fully appear as I proceed with my specification.

In the drawing:

Fig. 1 is a vertical sectional view through a cake plate of molded fibrous material, embodying the preferred form of the invention and illustrates a cake in position thereon.

Fig. 2 is a top plan view of the cake plate on an enlarged scale.

Fig. 3 is a vertical sectional view through the cake plate shown in and on the scale of Fig. 2, the plane of the section being taken on the line 3—3 of Fig. 2.

Fig. 4 is a detail fragmentary view in side elevation of a part of the cake plate at the outer end of one of the hollow projections thereof.

Referring now in detail to that embodiment of the invention, illustrated in the accompanying drawing, the cake plate herein is preferably die-molded from a suitable pulp solution by methods and on machines which are now conventional. The plate may be made in any one of a number of different shapes. As shown herein it takes the form of a round or circular sheet including a number of arcuately spaced, flat and substantially segmental portions 6 all disposed in the same horizontal plane. The portions 6 are spaced apart by hollow projections 7 extending from that side of the sheet which forms the bottom side thereof. The flat portions 6 make up the major area of the sheet and form the cake supporting portion thereof. The hollow projections 7 make up the minor area of the sheet and form the greater part of the vapor dissipating portion of the sheet.

Centrally in the sheet is a circular hollow depression 8 arranged on the same side of the sheet as the projections 7. Said depression has a flat bottom wall 9 and an upwardly and outwardly flaring side wall 10. The inner ends of the hollow projections 7 open into said depression to provide communication therewith.

Preferably there is an odd number of said projections 7, each of which includes a flat bottom wall 11 and upwardly and outwardly flaring side walls 12—12, respectively. The projections 7 taper in width from the outer to the inner end and the flat bottom wall of each projection is disposed in the plane of and merges into the flat bottom wall of the depression. Each projection is of a peculiar configuration or shape so that it is of a length greater than the distance between the depression 8 and the peripheral margin of the sheet as taken on a line radiating from the center of the depression. As shown herein, said shape is such that a diametrical line passing through the center of the depression, must pass through parts of a plurality of such depressions in a direction other than along the length thereof and through parts of a plurality of the flat cake supporting and engaging portions.

In the plate illustrated herein, there are seven of such hollow projections so that such a diametrical line as indicated by the section line 3—3 on Fig. 2, passes through three of the portions 6 and three of the projections 7 as well as through the depressions 8. Each hollow projection as shown herein is of a somewhat ogee shape as appears in Fig. 2, and the inner and outer ends are so radially offset that the inner end of one projection opens into the depression 8, in the radial plane of the outer end of the next projection, in one direction around the sheet.

Therefore, no matter where the diametrical line before mentioned may be taken, it cannot follow throughout the length of any one depression or flat portion 6. On the contrary, any section on a line anywhere placed upon the plate would disclose a section wherein the projections and flat portions alternate as appears in Fig. 3. This arrangement thus provides flexure resistant trusses or arches along any diametrical line on the sheet so that the plate is exceedingly stiff and rigid considering the material of which it is made.

Returning now to the structure of each hollow projection 7, it is pointed out that the outer end thereof is formed by an upwardly and outwardly inclined wall 14 spaced radially inward from the peripheral edge of the plate. This wall merges into a downwardly curved flange 15 the lateral ends of which merge into the sides of adjacent flat portions 6. This flange defines a passage 16 which communicates with the interior of its associated hollow projection. The flanges 15 provide inverted arches which in connection with the associated wall 14, connect the ends of adjacent portions 6 together, so as to further increase the rigidity of the plate as a whole at these points.

As before stated, the flat sector-like portions 6 collectively make up the major areas of the plate. To prevent warpage of these portions in the production of the plate as well as to increase communication between the projections 7 for a better venting of the vapors, the flat, substantially sector-like portions 6 are each provided with a projection 17 respectively, arranged on the same side of the sheet as the projections 7. These projections 17, are of a depth less than the projections 7. They form arcuate grooves in the top surface of the portions 6 which are concentric with the center of the plate, with each groove opening at its ends through the side walls 12—12 of and into adjacent projections 7. By reason of the projections 17, the flat portions 6—6 are stiffened annularly as well as in a radial direction so that said portions remain flat and do not warp out of shape during the production of the plate.

The upward and outward flare of the side walls of the depression and the side and end walls of the hollow projection is of such an angle or angles as to permit of a close nesting of the plates in packing.

In Fig. 1, I have shown a cake 18 arranged on the plate and the same is illustrated as having an icing 19 thereon. Such a cake when removed from its baking pan is quite warm. The cake so disposed upon the plate will have areas of support upon the flat portions 6 and will span not only the center depression 8 but will also span the hollow projections 7 and 17 to cover the same.

As previously stated, a vapor is generated particularly in cakes having a fat content which if not vented to atmosphere as fast as it is produced, is condensed as moisture. However, as all of the projections open at their inner ends into the central projection and communicate at their outer ends with atmosphere by means of the passages 16, and by reason of the projections 17, there is an intercommunication between the several hollow projections and a communication between each projection and atmosphere. Thus a circulation is possible through the various hollow projections so that such vapor as is generated in the cake finds an outlet or escape to atmosphere. Therefore, condensation is reduced to a minimum so that little or no moisture can form between the cake and plate to make the cake bottom soggy or to be absorbed by the cake.

As the cake plate and cake bottom remain substantially dry, the transfer of taste which can only occur in the presence of moisture, is reduced to a minimum if not entirely eliminated.

It is apparent that no matter at which point the plate with a cake thereon is picked up, the line of stress passing through the center of the plate must pass through a plurality of alternately and intermediately spaced flat and trussed portions which rigidify or stiffen the plate against flexing and cracking along said line. Therefore, even though the material of which the plate is made in itself is lacking in strength or stiffness, the requisite stiffness and rigidity to make the plate practical in use is provided by the arrangement of the projections mentioned.

While in describing the invention, I have referred in detail to the form and arrangement of the parts thereof, the same is to be considered only in the illustrative sense so that I do not wish to be limited thereto except as may be specifically set forth in the appended claims.

I claim as my invention:

1. A plate of the kind described comprising a sheet of fibrous material having a plurality of flat cake supporting and engaging portions and having other portions formed to provide a plurality of non-radial, hollow projections extending from one side of said cake supporting and engaging portions, said hollow projections extending inwardly from the peripheral margin of the plate and being of such configuration that a diametrical line through the center of the plate passes through parts of more than one of said projections in a direction other than the length thereof.

2. A plate of the kind described comprising a sheet of fibrous material substantially flat throughout its major portion and having a central depression extending from one side of the plate and having other portions formed to provide a plurality of hollow projections on the same side of the plate and extending outwardly from said depression toward the peripheral margin of the plate, the inner end of each hollow projection opening into said depression in a radial plane different from that of the radial plane of the outer end of said projection.

3. A plate of the kind described comprising a sheet of fibrous material having a plurality of flat cake suporting and engaging portions and having other portions formed to provide a plurality of non-radial, hollow projections extending from one side of said cake supporting and engaging portions, said hollow projections extending inwardly from the peripheral margin of the plate and being of such configuration that a diametrical line through the center of the plate passes through parts of at least three of said projections.

4. A plate of the kind described comprising a sheet of fibrous material having a plurality of flat cake supporting and engaging portions and having other portions formed to provide a plurality of non-radial, hollow projections extending from one side of said cake supporting and engaging portions, said hollow projections tapering in width and extending inwardly from the peripheral margin of the plate and being of such configuration that a diametrical line through the center of the plate passes through parts of more than one of said projections in a direction other than the length thereof.

5. A plate of the kind described comprising a sheet of fibrous material having a plurality of flat cake supporting and engaging portions and having other portions formed to provide a plurality of non-radial, hollow projections extending from said side of said cake supporting and engaging portions, said hollow projections which open through the peripheral margin of the plate extending inwardly from said margin and being of such a configuration that a diametrical line through the center of the plate passes through more than one of said projections in a direction other than the length thereof.

TORRIS H. ALFREDS.